US011894201B1

(12) United States Patent
Lin et al.

(10) Patent No.: US 11,894,201 B1
(45) Date of Patent: Feb. 6, 2024

(54) ILLUMINATED KEYBOARD

(71) Applicant: SUNREX TECHNOLOGY CORP., Taichung (TW)

(72) Inventors: Shih-Pin Lin, Taichung (TW); Chao-Chieh Yang, Taichung (TW)

(73) Assignee: SUNREX TECHNOLOGY CORP., Taichung (TW)

( * ) Notice: Subject to any disclaimer, the term of this patent is extended or adjusted under 35 U.S.C. 154(b) by 0 days.

(21) Appl. No.: 17/978,353

(22) Filed: Nov. 1, 2022

(30) Foreign Application Priority Data

Jul. 29, 2022 (TW) ................................ 111128646

(51) Int. Cl.
*H01H 13/705* (2006.01)
*H01H 13/83* (2006.01)

(52) U.S. Cl.
CPC .......... *H01H 13/705* (2013.01); *H01H 13/83* (2013.01)

(58) Field of Classification Search
CPC ......... H01H 2209/00; H01H 2209/004; H01H 2215/00; H01H 2215/044; H01H 2219/014; H01H 2219/018; H01H 2219/036; H01H 2219/038; H01H 2219/039; H01H 2219/044; H01H 2219/046; H01H 2219/05; H01H 2219/054; H01H 2219/062; H01H 2219/064; H01H 2219/0622; H01H 13/00; H01H 13/26; H01H 13/50; H01H 13/70; H01H 13/7006; H01H 13/702; H01H 13/704; H01H 13/705; H01H 13/7057; H01H 13/83; H01H 3/00; H01H 3/12; H01H 3/14; H01H 3/16; H01H 3/18; H01H 3/181; H01H 3/182; H01H 2003/12; H01H 2009/16; H01H 2009/161
See application file for complete search history.

(56) References Cited

U.S. PATENT DOCUMENTS 10,886,082 B1 * 1/2021 Wang .................... H01H 13/83

FOREIGN PATENT DOCUMENTS

TW I697927 B 7/2020

* cited by examiner

*Primary Examiner* — Anthony R Jimenez
(74) *Attorney, Agent, or Firm* — Muncy, Geissler, Olds & Lowe, P.C.

(57) ABSTRACT

An illuminated keyboard includes a supporting plate, a bottom circuit membrane disposed on the support plate, an intermediate partition plate disposed above the bottom circuit membrane, and a top circuit membrane disposed above said intermediate partition plate. A light emitter unit is disposed on the bottom circuit membrane. A light diffusion layer is disposed above the top circuit membrane and has a light transmission region for transmitting light rays generated from the light emitter unit. An elastic member is made of an elastic material and disposed on and above the diffusion layer. A bridging unit is disposed above the diffusion layer and aligned with the elastic member. A keycap is disposed above and connected to the bridging unit. The elastic member elastically abuts against the keycap. The keycap is light permeable.

6 Claims, 4 Drawing Sheets

ILLUMINATED KEYBOARD

CROSS-REFERENCE TO RELATED APPLICATION

This application claims priority to Taiwanese Patent Application No. 111128646, filed on Jul. 29, 2022.

FIELD

The disclosure relates to a keyboard, and more particularly to an illuminated keyboard.

BACKGROUND

An existing illuminated keyboard, as disclosed in Taiwanese Patent No. I697927, includes a keyboard module and a backlight module. The keyboard module includes keycaps. The backlight module is disposed below the keyboard module, and includes a light emitter, a light guide plate, an interference unit, and a light spot unit. Light rays emitted from the light emitter enters and is received by the light guide plate. The interference unit guides part of the light rays received by the light guide plate to a designated region, thereby increasing brightness of the designated region. The light spot unit includes light spot portions respectively corresponding to the keycaps. When the light rays emitted from the light emitter through the light guide plate are transmitted to the light spot portions, the light spot portions direct the light rays into the keycaps so that the keycaps are luminous.

This existing illustrated keyboard has so many components and is complicated in structure, thereby causing manufacturing and assembling to be troublesome. Besides, the purpose of miniaturization is unable to be achieved.

Another existing illuminated keyboard, as disclosed in Taiwanese Patent No. I681431, includes a light guide substrate, a support plate, keycaps, lifting connectors, and a circuit board. The light guide substrate is made of a light guide material, functions to guide light rays, and includes connecting members to which the lifting connectors are assembled.

A light emitter is disposed on a side of the light guide substrate to project light rays to the light guide substrate. The light rays are transmitted upwardly to a bottom surface of the support plate through the light guide substrate and are reflected by a light-reflecting layer to the light guide substrate. As a result, the light rays are concentrated and pass upwardly through hollow portions of the support plate and the circuit board, thereby illuminating the keycaps to be used in an insufficient light environment.

Regarding this existing illuminated keyboard, the light-reflecting layer has to be disposed on the bottom surface of the support plate by ink through printing or coating. Alternatively, the light-reflecting layer may be an adhesive layer or a film, being fixed to the bottom surface of the support plate through a method, such as adhesion and heat fusion.

Accordingly, manufacturing the light-reflecting layer is troublesome and manufacture cost of the light-reflecting layer is increased.

SUMMARY

Therefore, an object of the disclosure is to provide an illuminated keyboard that can alleviate at least one of the drawbacks of the prior arts.

According to the disclosure, an illuminated keyboard includes a supporting plate, an electrical circuit unit, a light emitter unit, a light diffusion layer, an elastic member, a bridging unit, and a keycap.

The electrical circuit unit is disposed above the supporting plate, and includes a bottom circuit membrane, an intermediate partition plate, and a top circuit membrane. The bottom circuit membrane is disposed adjacent to the supporting plate, and has a bottom conductive portion. The intermediate partition plate is disposed above the bottom circuit membrane, and has a through hole aligned with the bottom conductive portion, and a plurality of bottom perforated holes surrounding the through hole. The top circuit membrane is disposed above the intermediate partition plate, and has a top conductive portion aligned with the through hole and the bottom conductive portion, and a plurality of top perforated holes surrounding the top conductive portion.

The light emitter unit is disposed on the bottom circuit membrane and includes a plurality of light emitters surrounding the bottom conductive portion. Each of the light emitters protrudes through a respective one of the bottom perforated holes toward a respective one of the top perforated holes.

The light diffusion layer is disposed above the top circuit membrane and has a light transmission region for transmitting light rays generated from the light emitters.

The elastic member is made of an elastic material, aligned with the top conductive portion and disposed on and above the diffusion layer.

The bridging unit is disposed above the diffusion layer and aligned with the elastic member.

The keycap is disposed above and connected to the bridging unit. The elastic member elastically abuts against the keycap. The keycap is light permeable.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
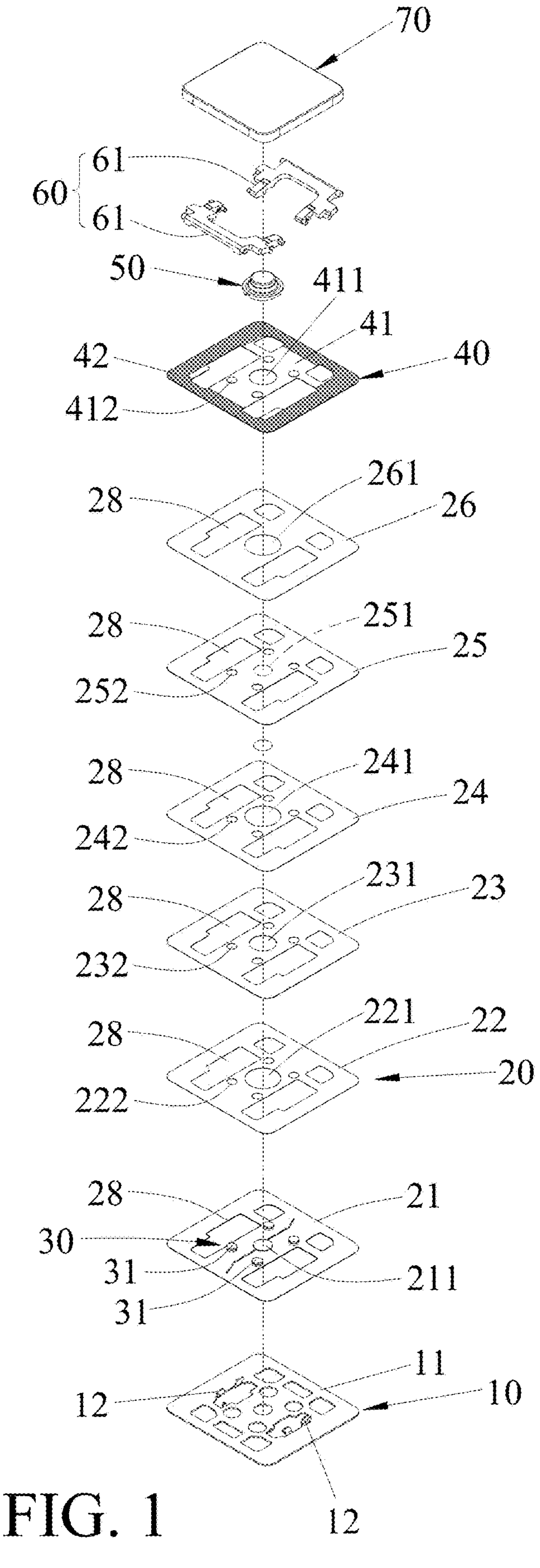
FIG. 1 is an exploded perspective view illustrating an illustrated keyboard according to an embodiment of the disclosure.
Figure 2:
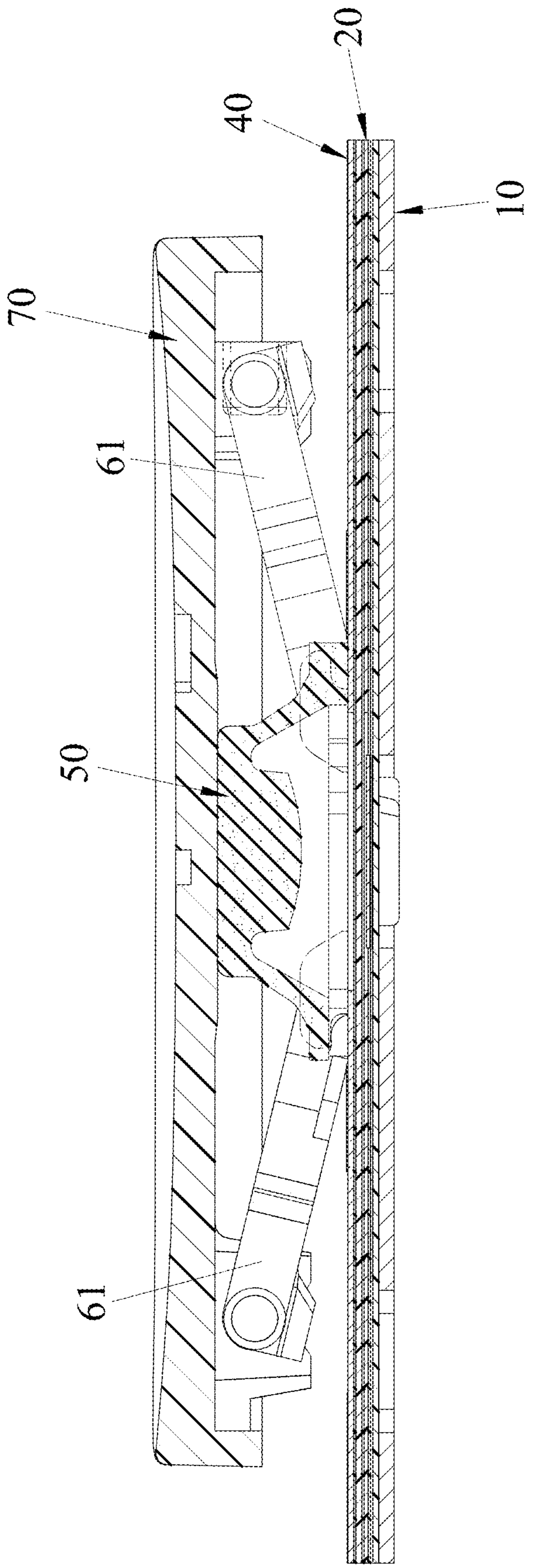
FIG. 2 is a sectional view of the embodiment.
Figure 3:
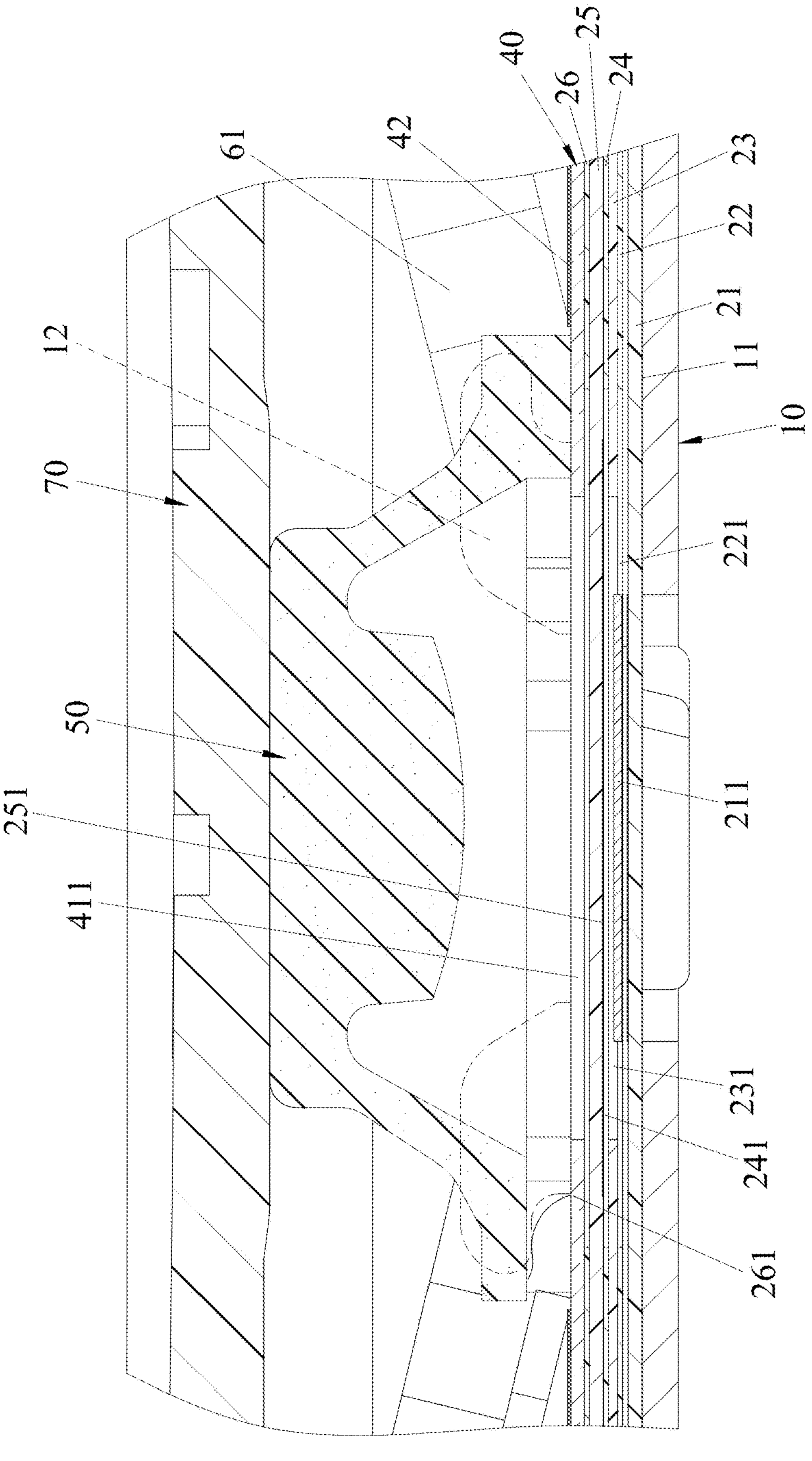
FIG. 3 is a fragmentary enlarged sectional view of the embodiment.

FIGS. 1 to 3 illustrate an illuminated keyboard according to an embodiment of the disclosure. The illuminated keyboard includes a supporting plate 10, an electrical circuit unit 20, a light emitter unit 30, a light diffusion layer 40, an elastic member 50, a bridging unit 60, and a keycap 70. To simplify the drawings and to facilitate description, the other components of the keyboard of the disclosure are omitted.

The supporting plate 10 is made of metal, and has a top surface 11, and a plurality of lower connecting members 12 protruding from the top surface 11.

The electrical circuit unit 20 is disposed above the supporting plate 10, and includes a bottom circuit membrane 21, a first transparent water-proof layer 22, an intermediate partition plate 23, a second transparent water-proof layer 24, a top circuit membrane 25, and a third transparent water-proof layer 26.

The bottom circuit membrane 21 is disposed adjacent to the supporting plate 10, and has a bottom conductive portion 211. In this embodiment, the bottom circuit membrane 21 is disposed on the top surface 11 (see FIG. 3).

The first transparent water-proof layer 22 is disposed on and directly above the bottom circuit membrane 21, and has a first through hole 221 aligned with the bottom conductive portion 211, and a plurality of first perforated holes 222 surrounding the first through hole 221. The first transparent water-proof layers 22 protects the bottom circuit membrane 21 from being corroded by wet gases and liquids to cause a short circuit.

The intermediate partition plate 23 is disposed on and directly above the first transparent water-proof layer 22 such that the first transparent water-proof layer 22 is disposed between the bottom circuit membrane 21 and the intermediate partition plate 23. The intermediate partition plate 23 has an intermediate through hole 231 aligned with the bottom conductive portion 211 and the first through hole 221, and a plurality of bottom perforated holes 232 that surround the intermediate through hole 231 and that are respectively aligned with the first perforated holes 222.

The second transparent water-proof layer 24 is disposed on and directly above the intermediate partition plate 23. The second transparent water-proof layer 24 has a second through hole 241 aligned with the bottom conductive portion 211, the first through hole 221 and the intermediate through hole 231, and a plurality of second perforated holes 242 that surround the second through hole 241 and that are respectively aligned with the bottom perforated holes 232.

The top circuit membrane 25 is disposed on and directly above the second transparent water-proof layer 24. The top circuit membrane 25 has a top conductive portion 251 aligned with the second through hole 241, the intermediate through hole 231, the first through hole 221 and the bottom conductive portion 211, and a plurality of top perforated holes 252 that surround the top conductive portion 251 and that are respectively aligned with the second perforated holes 242.

Figure 4:
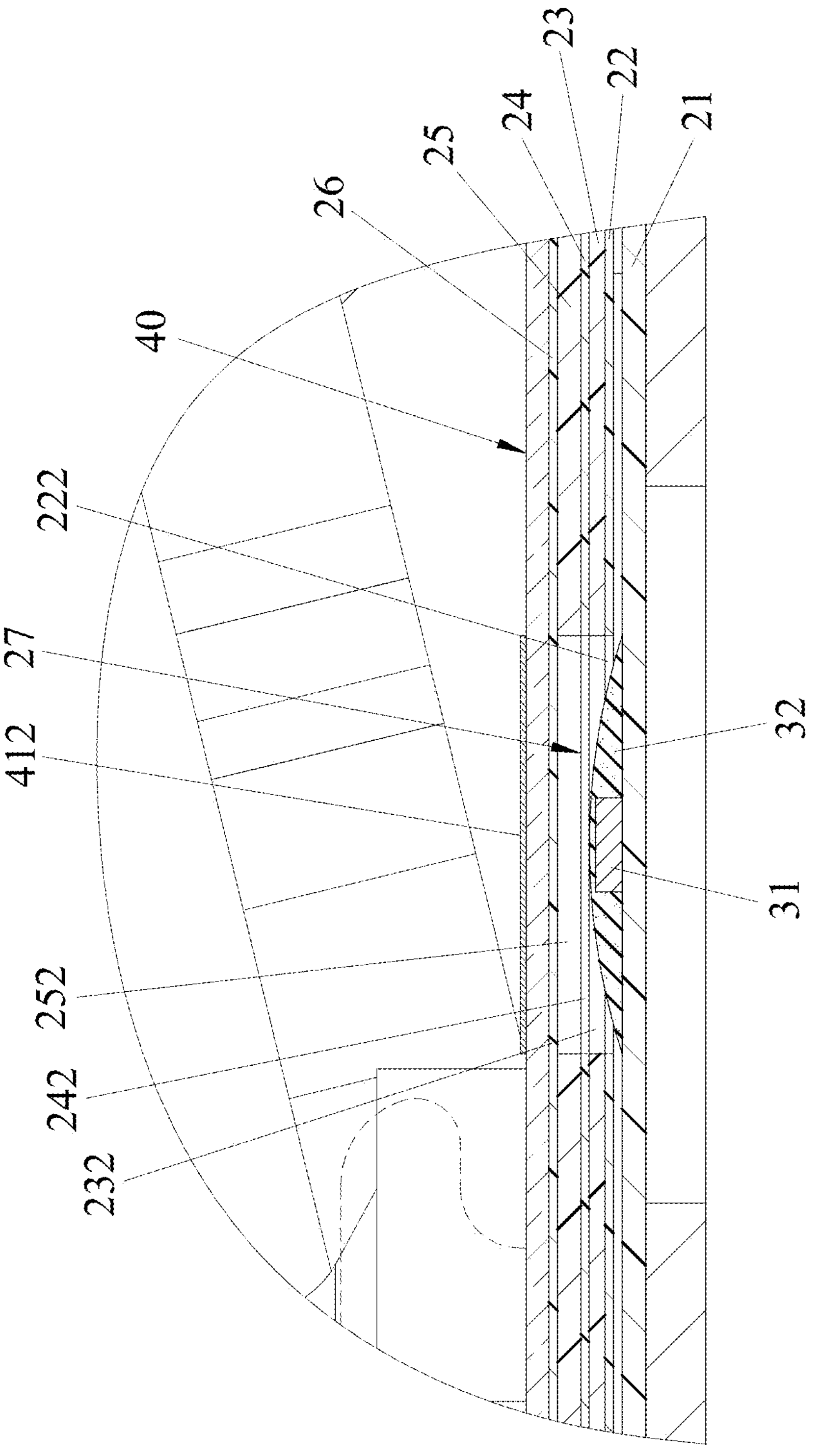
FIG. 4 is another fragmentary enlarged sectional view of the embodiment.

The third transparent water-proof layer 26 is disposed on and directly above the top circuit membrane 25, and has a third through hole 261 aligned with the top conductive portion 251, the second through hole 241, the intermediate through hole 231, the first through hole 221, and the bottom conductive portion 211. As shown in FIG. 4, each of the first perforated holes 222 cooperates with a respective one of the bottom perforated holes 232, a respective one of the second perforated holes 242, and a respective one of the top perforated holes 252 to define a light source chamber 27. The third transparent water-proof layer 26 prevents the wet gases and liquids from flowing into the light source chamber 27 and causing a short circuit.

In this embodiment, each of the bottom circuit membrane 21, the first transparent water-proof layer 22, the intermediate partition plate 23, the second transparent water-proof layer 24, the top circuit membrane 25, and the third transparent water-proof layer 26 further has a plurality of openings 28. The lower connecting members 12 of the supporting plate 10 extend upwardly through the openings 28 of the bottom circuit membrane 21, the first transparent water-proof layer 22, the intermediate partition plate 23, the second transparent water-proof layer 24, the top circuit membrane 25, and the third transparent water-proof layer 26.

The light emitter unit 30 is adhered to the bottom circuit membrane 21 and includes a plurality of light emitters 31 surrounding the bottom conductive portion 211 of the bottom circuit membrane 21. As shown in FIGS. 1, 3 and 4, each of the light emitters 31 protrudes through a respective one of the first perforated holes 222, the respective bottom perforated hole 232, and the respective second perforated hole 242 toward the respective top perforated hole 252. As a result, each of the light emitters 31 is accommodated within the light source chamber 27 defined by the respective first perforated hole 222, the respective bottom perforated hole 232, the respective second perforated hole 242, and the respective top perforated hole 252, and is covered and fixed by a transparent diffusion gel 32. In this embodiment, each of the light emitters 31 is a micro LED.

The light diffusion layer 40 is disposed on and directly above the third transparent water-proof layer 26. The light diffusion layer 40 has a light transmission region 41 for transmitting light rays generated from the light emitters 31, and a black light shielding portion 42 that surrounds the light transmission region 41 in a frame-like manner. The light transmission region 41 has a perforation 411 aligned with the elastic member 50, and a plurality of light diffusion portions 412 surrounding the perforation 411. Each of the light diffusion portions 412 is aligned with a respective one of the light emitters 31, and is printed with atomized white ink.

The elastic member 50 is made of an elastic material (e.g., silicone), is aligned with the top conductive portion 251 and the perforation 411, and is disposed on and above the diffusion layer 40.

The bridging unit 60 is disposed on and above the diffusion layer 40 and aligned with the elastic member 50. The bridging unit 60 includes two upper connecting members 61 pivotally connected to each other. The upper connecting members 61 respectively have bottom portions pivotally connected to the lower connecting members 12 of the supporting plate 10.

The keycap 70 is disposed on and above the bridging unit 60, and is pivotally connected to upper portions of the upper connecting members 61. The elastic member 50 elastically abuts against the keycap 70. The keycap 70 is light permeable, and has a symbol, text or pattern displayed thereon (not shown).

Referring to FIGS. 2 and 3, when the keycap 70 is pressed, by virtue of the bridging unit 60 being pivotally connected to lower connecting members 12 of the supporting plate 10 and the keycap 70 being pivotally connected to the bridging unit 60, the elastic member 50 is moved smoothly together with the keycap 70 toward the electrical circuit unit 20, so that the top conductive portion 251 of the top circuit membrane 25 moves into contact with the bottom conductive portion 211 of the bottom circuit membrane 21 to generate a signal. Based on the signal, each light emitter 31 emits the light rays to the keycap 70 through the light source chamber 27 and the light diffusion layer 40, so that the keycap 70 is illuminated (not shown).

According to the disclosure, the illuminated keyboard produces the following effects.

1. Because the light diffusion layer 40 is disposed on and directly above the third transparent water-proof layer 26, and because the light diffusion portions 412 of the light transmission region 41 are respectively aligned with the light emitters 31, the light rays generated from the light emitters 31 are transmitted to the keycap 70 through the light transmission region 41 so that the keycap 70 is illuminated. Besides, it is simple for manufacturing that the light transmission region 41 is surrounded by the black light shielding portion 42 in the frame-like manner. By virtue of the light diffusion portions 412 respectively aligned with the light emitters 31, the light rays generated from the light emitters 31 are softened by the light diffusion portions 412.

2. As shown in FIG. 4, by virtue of the transparent diffusion gel 32 covering the light emitter 31, a light diffusion effect can be produced.

3. As shown in FIGS. 1, 3, and 4, by virtue of the light source chambers 27 accommodating the light emitters 31, the light emitters 31 are prevented from adversely affecting electrical contact between the top conductive portion 251 of the top circuit membrane 25 and the bottom conductive portion 211 of the bottom circuit membrane 21 when the keypad 70 is pressed.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An illuminated keyboard, comprising:
- a supporting plate;
- an electrical circuit unit disposed above said supporting plate, and including
  - a bottom circuit membrane disposed adjacent to said supporting plate, and having a bottom conductive portion,
  - an intermediate partition plate disposed above said bottom circuit membrane, and having an intermediate through hole aligned with said bottom conductive portion and a plurality of bottom perforated holes surrounding said intermediate through hole, and
  - a top circuit membrane disposed above said intermediate partition plate, and having a top conductive portion aligned with said intermediate through hole and said bottom conductive portion, and a plurality of top perforated holes surrounding said top conductive portion;
- a light emitter unit disposed on said bottom circuit membrane and including a plurality of light emitters surrounding said bottom conductive portion, each of said plurality of light emitters protruding through a respective one of said bottom perforated holes toward a respective one of said top perforated holes;
- a light diffusion layer disposed above said top circuit membrane and having a light transmission region for transmitting light rays generated from said plurality of light emitters;
- an elastic member made of an elastic material, aligned with said top conductive portion and disposed above and on said light diffusion layer;
- a bridging unit disposed above said light diffusion layer and aligned with said elastic member; and
- a keycap disposed above and connected to said bridging unit, said elastic member elastically abutting against said keycap, said keycap being light permeable.

2. The illuminated keyboard as claimed in claim 1, wherein:
- said electrical circuit unit further includes a first transparent water-proof layer disposed between said bottom circuit membrane and said intermediate partition plate, a second transparent water-proof layer disposed between said intermediate partition plate and said top circuit membrane, and a third transparent water-proof layer disposed between said top circuit membrane and said light diffusion layer;
- said first transparent water-proof layer has a first through hole aligned with said bottom conductive portion, and a plurality of first perforated holes surrounding said first through hole;
- said second transparent water-proof layer has a second through hole aligned with said bottom conductive portion, and a plurality of second perforated holes surrounding said second through hole;
- said third transparent water-proof layer has a third through hole aligned with said bottom conductive portion; and
- each of said first perforated holes cooperates with a respective one of said bottom perforated holes, a respective one of said second perforated holes, and a respective one of said top perforated holes to define a light source chamber that accommodates a respective one of said plurality of light emitters.

3. The illuminated keyboard as claimed in claim 1, wherein each of said plurality of light emitters is a micro LED.

4. The illuminated keyboard as claimed in claim 1, wherein said light diffusion layer has a black light shielding portion that surrounds said light transmission region of said light diffusion layer.

5. The illuminated keyboard as claimed in claim 4, wherein said light transmission region has a perforation aligned with said elastic member, and a plurality of light diffusion portions surrounding said perforation, each of said light diffusion portions being aligned with a respective one of said plurality of light emitters.

6. The illuminated keyboard as claimed in claim 5, wherein each of said light diffusion portions is printed with atomized white ink.

* * * * *